United States Patent
Okanobu

(10) Patent No.: US 6,788,747 B1
(45) Date of Patent: Sep. 7, 2004

(54) RECEIVER CAPABLE OF RECEIVING ANALOG BROADCAST AND DIGITAL BROADCAST AND IC FOR THE SAME

(75) Inventor: Taiwa Okanobu, Tokyo (JP)

(73) Assignee: Sony Corporation, Tokyo (JP)

(*) Notice: Subject to any disclaimer, the term of this patent is extended or adjusted under 35 U.S.C. 154(b) by 717 days.

(21) Appl. No.: 09/663,770

(22) Filed: Sep. 18, 2000

(30) Foreign Application Priority Data

Sep. 17, 1999 (JP) .......................................... P11-263065

(51) Int. Cl.[7] .............................................. H04L 27/22
(52) U.S. Cl. ...................................................... 375/316
(58) Field of Search ................................ 375/316–352; 329/300, 372, 315

(56) References Cited

U.S. PATENT DOCUMENTS

| 4,835,792 | A | * | 5/1989 | Davarian ..................... 375/324 |
| 4,887,050 | A | * | 12/1989 | Borth et al. .................. 331/34 |
| 4,955,039 | A | * | 9/1990 | Rother et al. ............... 375/316 |
| 5,241,702 | A | * | 8/1993 | Dent ........................ 455/278.1 |
| 5,517,529 | A | * | 5/1996 | Stehlik ........................ 375/316 |
| 5,724,653 | A | * | 3/1998 | Baker et al. ................. 455/296 |
| 6,016,170 | A | | 1/2000 | Takayama et al. ........... 348/731 |
| 6,061,385 | A | * | 5/2000 | Ostman ....................... 375/130 |
| 6,307,599 | B1 | | 10/2001 | Komatsu ..................... 348/731 |

* cited by examiner

Primary Examiner—Stephen Chin
Assistant Examiner—Jason M. Perilla
(74) Attorney, Agent, or Firm—Jay H. Maioli

(57) ABSTRACT

A receiver equipped with first and second mixer circuits for performing frequency conversion of a received signal into two intermediate-frequency signals, phases of which are orthogonal to each other, by means of two local oscillation signals, and a plurality of filter circuits for taking the intermediate-frequency signals out of the output signals of the first and the second mixer circuits. The receiver is further equipped with a demodulation circuit for taking a signal indicating broadcast contents of an analog broadcast or a digital broadcast out of the intermediate-frequency signals taken out by the filter circuits. The frequencies of the local oscillation signals are made to be a frequency apart from the carried frequency of the received signal by the intermediate frequency of the intermediate-frequency signals at a time of receiving the analog broadcast, and the frequency of the local oscillation signals are made to be a frequency equal to the center frequency of the received signal at a time of receiving the digital broadcast.

13 Claims, 3 Drawing Sheets

RECEIVER CAPABLE OF RECEIVING ANALOG BROADCAST AND DIGITAL BROADCAST AND IC FOR THE SAME

BACKGROUND OF THE INVENTION

1. Field of the Invention

The present invention relates to a receiver capable of receiving an analog broadcast and a digital broadcast and an integrated circuit (IC) for the same.

2. Description of Related Art

In the current amplitude modulation (AM) broadcast and the current frequency modulation (FM) broadcast, the processing of materials to be broadcast is being digitized. However, the broadcasts themselves are performed in an analog system, hereafter the analog system broadcast will be called as an "analog broadcast".

However, if the broadcasts themselves are digitized, a broadcast in high quality can be supplied, and additional data service can be enabled, and further the efficiency of frequency utilization can be improved. Accordingly, a digital broadcast, in which broadcasts themselves are digitized, is now under consideration.

As one of the digital broadcast system, DAB, namely, a digital audio broadcast in conformity with Eureka 147 standard is employed in Europe. On the other hand, Integrated Services Digital Broadcast for Terrestrial (ISDB-T) is proposed in Japan.

Incidentally, the ISDB-T is a standard employing the following specifications in a case of a narrow-band ISDB-T and mode 1 so that digital audio data of a plurality of channels and other digital data can simultaneously be broadcast.

- transmission bandwidth: 436 kHz
- carrier interval: 4 kHz
- carrier number: 109
- carrier-modulating system: 16QAM, 64QAM, QPSK, DQPSK
- multiplex system: MPEG2
- information rate: 283.1 kbps–1651.4 kbps In addition, the digital broadcast is scheduled to be mixed in the same frequency band as that of the analog broadcast, especially the FM broadcast. For example, in Europe and Japan, a vacant channel in the current VHF television broadcast is scheduled to be used for the digital broadcast.

Now, as a receiver for the analog broadcast, there is proposed a receiver that performs the frequency conversion of a received signal to intermediate-frequency signals of in-phase and quadrature, the phases of which are orthogonal to each other, and that eliminates image signals by executing phase-shift processing and operation processing of the intermediate-frequency signals (see e.g. IEEE Transactions on Consumer Electronics, Vol. 38, No. 3, Aug. 1992, pp. 465–475).

Because the intermediate-frequency can be lowered in such a structure, an intermediate-frequency filter can be made to be an IC, and therefore an entire receiver can be made in one chip IC.

Accordingly, it can be conceivable that a receiver for the digital broadcast is similarly structured. However, it is required for a receiver of the digital broadcast to have a disturbance-rejection ability more superior than that of a receiver of the analog broadcast. In addition, if a receiver that eliminates image signals in conformity with the aforementioned method is mass-produced, the limit of the ability of the elimination of the image signals is 35 dB–40 dB under the current semiconductor technique. This image rejection characteristic is not sufficient for the receiver of the digital broadcast.

Accordingly, there is also considered a receiver employing a receiving system in which the intermediate frequency is made to be zero at the time of frequency conversion, i.e. the direct conversion system, so that the image signals themselves are not generated. However, in a broadcast wave signal of the analog broadcast, a carrier signal has much energy, and if the carrier signal is eliminated, large distortion is generated. Consequently, the direct conversion system has problems in direct current amplification and a direct current offset.

Furthermore, the digital broadcast occupies wider bandwidth than that of the analog broadcast. In addition, because the digital broadcast uses a vacant channel of the current VHF television broadcast in Europe and Japan, a strong television broadcast wave exists adjacently to the digital broadcast wave. And further, as mentioned above, the requirement for the disturbance-rejection ability for the receiver of the digital broadcast is stricter than that for the receiver of the analog broadcast.

SUMMARY OF THE INVENTION

The present invention aims to enable a single receiving circuit to receive both an analog broadcast and a digital broadcast, and to realize the receiving circuit in an IC. In addition, the present invention aims to resolve the aforesaid problems on the occasion of realizing the receiving circuit.

According to a first aspect of the present invention, there is provided a receiver for receiving an analog broadcast and a digital broadcast, the receiver comprising: a mixer circuit for performing a frequency conversion of a received signal to an intermediate-frequency signal by means of a local oscillation signal; a filter circuit for taking the intermediate-frequency signal out of an output signal of the mixer circuit; and a demodulation circuit for taking a signal indicating broadcast contents in the analog broadcast or the digital broadcast out of the intermediate-frequency signal taken out by means of the filter circuit, wherein the receiver is constructed so that, at a time of receiving the analog broadcast, a frequency of the local oscillation signal is apart from a carrier frequency of the received signal by an intermediate frequency of the intermediate-frequency signal and that, at a time of receiving the digital broadcast, the demodulation circuit takes the signal indicating broadcast contents in the analog broadcast out of the intermediate-frequency signal, and the receiver is constructed so that the frequency of the local oscillation signal is equal to a center frequency of the received signal and that the demodulation circuit takes the signal indicating broadcast contents in the digital broadcast out of the intermediate-frequency signal.

According to a second aspect of the present invention, there is provided a receiver for receiving an analog broadcast and a digital broadcast, the receiver comprising: a first mixer circuit and a second mixer circuit for performing a frequency conversion of a received signal to a first intermediate-frequency signal and a second intermediate-frequency signal, respectively, phases of which are orthogonal to each other by means of a local oscillation signal; a first filter circuit and a second filter circuit for taking the first intermediate-frequency signal and the second intermediate-frequency signal out of output signals of the first mixer circuit and the second mixer circuit, respectively; and a demodulation circuit for taking a signal indicating broadcast contents in the analog broadcast or the digital broadcast out of the first intermediate-frequency signal and the second intermediate-frequency signal taken out by means of the first filter circuit and the second filter circuit, wherein the receiver is constructed so that, at a time of receiving the analog broadcast, a frequency of the local oscillation signal is apart from a carrier frequency of the received signal by an intermediate frequency of the first intermediate-frequency signal and the second intermediate-frequency signal and that the demodulation circuit takes the signal indicating broadcast contents in the analog broadcast out of the first intermediate-frequency signal and the second intermediate-frequency signal, and the receiver is constructed so that, at a time of receiving the digital broadcast, the frequency of the local oscillation signal is equal to a center frequency of the received signal and that the demodulation circuit takes the signal indicating broadcast contents in the digital broadcast out of the first intermediate-frequency signal and the second intermediate-frequency signal.

According to a third aspect of the present invention, there is provided an IC for receiving an analog broadcast and a digital broadcast, the IC comprising: a mixer circuit for performing a frequency conversion of a received signal to an intermediate-frequency signal by means of a local oscillation signal; and a filter circuit for taking the intermediate-frequency signal out of an output signal of the mixer circuit, wherein the IC is constructed so that, at a time of receiving the analog broadcast, a frequency of the local oscillation signal is apart from a carrier frequency of the received signal by an intermediate frequency of the intermediate-frequency signal and that, at a time of receiving the digital broadcast, the frequency of the local oscillation signal is equal to a center frequency of the received signal and further that a signal indicating broadcast contents in the analog broadcast or the digital broadcast out of the intermediate-frequency signal taken out by the filter circuit.

According to a fourth aspect of the present invention, there is provided an IC for receiving an analog broadcast and a digital broadcast, the IC comprising: a first mixer circuit and a second mixer circuit for performing a frequency conversion of a received signal to a first intermediate-frequency signal and a second intermediate-frequency signal, respectively, phases of which are orthogonal to each other by means of a local oscillation signal; and a first filter circuit and a second filter circuit for taking the first intermediate-frequency signal and the second intermediate-frequency signal out of output signals of the first mixer circuit and the second mixer circuit, respectively, wherein the IC is constructed so that, at a time of receiving the analog broadcast, a frequency of the local oscillation signal is apart from a carrier frequency of the received signal by an intermediate frequency of the first intermediate-frequency signal and the second intermediate-frequency signal and that, at a time of receiving the digital broadcast, the frequency of the local oscillation signal is equal to a center frequency of the received signal and further that a signal indicating broadcast contents in the analog broadcast or the digital broadcast out of the first intermediate-frequency signal and the second intermediate-frequency signal taken out by the first filter circuit and the second filter circuit.

Accordingly, the present invention provides a receiver and an IC in which an analog broadcast is received through a superheterodyne system and a digital broadcast is received through a direct conversion system.

According to the aforesaid aspects of the present invention, an image rejection characteristic and an adjacent disturbance wave characteristic necessary for receiving an analog broadcast or a digital broadcast can be obtained. In addition, the intermediate frequency can be lowered. Consequently, the receiving circuit including an intermediate-frequency filter can be made to be an IC. Moreover, almost all of the circuits can be shared in a case of installing them in an IC, and thereby it can be realized to miniaturize the shape thereof and to lower the price thereof. Furthermore, when an analog broadcast is received, there is no need to consider DC amplification and a DC offset. Besides, when a digital broadcast is received, there occurs no problem owing to the DC offset.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
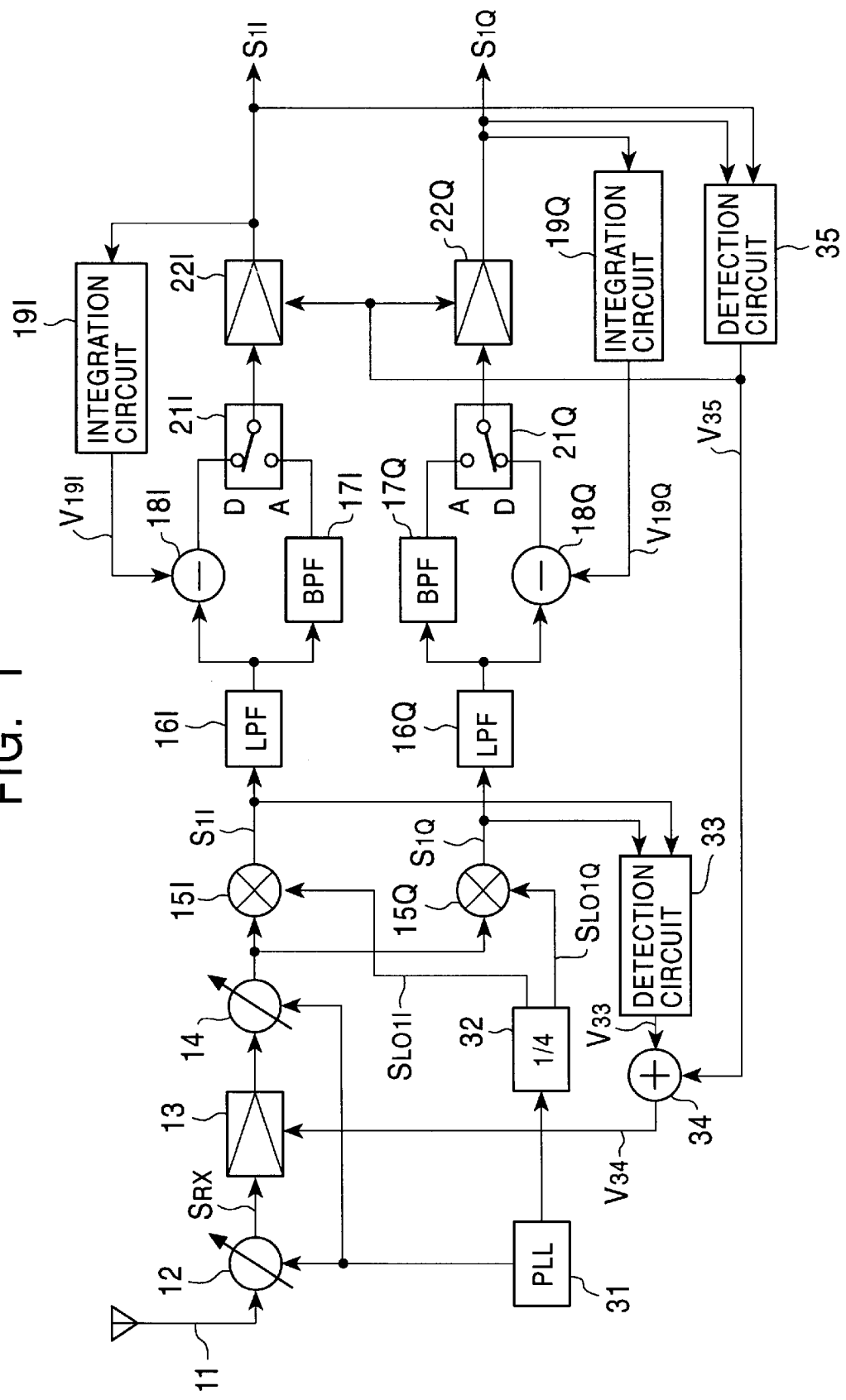
FIG. 1 is a system diagram showing a part of an embodiment of the present invention.
Figure 2:
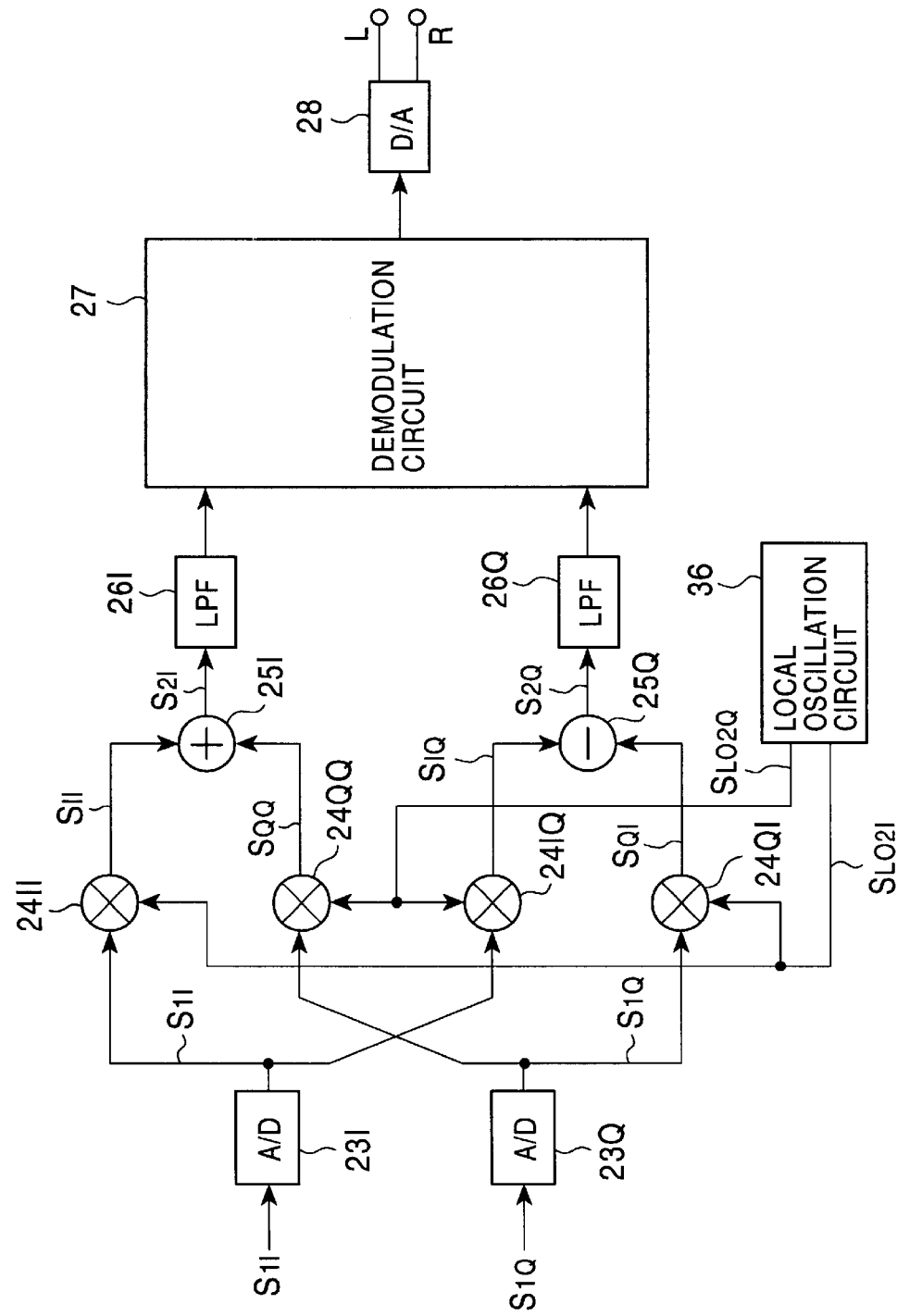
FIG. 2 is a system diagram showing the other part of the embodiment of the present invention.

FIGS. 1 and 2 show an embodiment of the present invention applied to a receiver for receiving narrow band ISDB-T and an FM broadcast as the digital broadcast and the analog broadcast, respectively. Incidentally, FIG. 1 and FIG. 2 are respectively a part of the same receiving circuit divided in two parts for a reason of the size of a sheet of paper, the right side of FIG. 1 continues to the left side of FIG. 2.

The receiving circuit shown in FIGS. 1 and 2 exhibits a structure and an operation as a receiving circuit in accordance with the direct conversion system when the receiving circuit receives the narrow band ISDB-T. That is, a broadcast wave of the narrow band ISDB-T is received by an antenna 11, and the received signal is supplied to an antenna tuning circuit 12 of an electronic tuning system. Then, as shown in, for example, FIG. 3A, a received signal $S_{RX}$, the center frequency of which is supposed to be $f_{RX}$, having a target frequency is taken out and the received signal $S_{RX}$ is supplied to first mixer circuits 15I and 15Q through a variable gain amplifier 13 for AGC and an interstage tuning circuit 14 of the electronic tuning system.

Figure 3A:
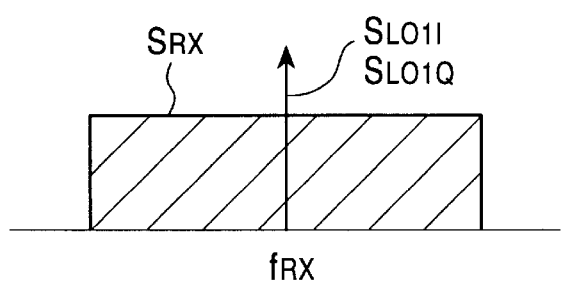
FIGS. 3A to 3D are graphs explaining the operation of the present invention.

Moreover, an oscillation signal having a predetermined frequency is formed in a PLL 31. The formed oscillation signal is supplied to a dividing circuit 32. By the dividing circuit 32, the supplied oscillation signal is divided into two signals $S_{LO1I}$ and $S_{LO1Q}$ having the same frequency as the center frequency $f_{RX}$ of the received signal $S_{RX}$ and having phases different from each other by an angle of 90° as shown in FIG. 3A. The divided signals $S_{LO1I}$ and $S_{LO1Q}$ are supplied to the mixer circuits 15I and 15Q, respectively, as first local oscillation signals.

Figure 3B:
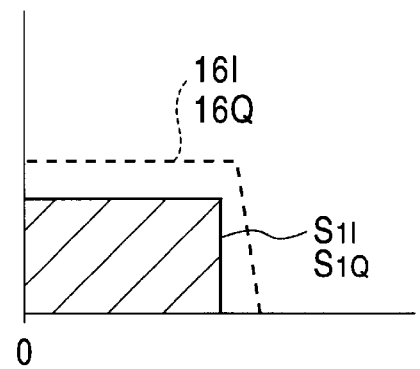

Thus, the frequency conversion of the received signal $S_{RX}$ is executed to make the received signals $S_{RX}$ intermediate-frequency signals (base band signals) $S_{1I}$ and $S_{1Q}$ having an original center frequency of zero by the mixer circuits 15I and 15Q as shown in FIG. 3B.

In this case, because the center frequency $f_{RX}$ of the received signal $S_{RX}$ and the frequencies of the first local oscillation signals $S_{LO1I}$ and $S_{LO1Q}$ are the same, signal components on the frequency side lower than the center frequency $f_{RX}$ of the received signal $S_{RX}$ and signal components on the frequency side higher than the center frequency $f_{RX}$ of the received signal $S_{RX}$ are overlapped on each other in the intermediate-frequency signals $S_{1I}$ and $S_{1Q}$. Accordingly, the intermediate-frequency signals $S_{1I}$ and $S_{1Q}$ occupy the bandwidth half as wide as the original received signal $S_{RX}$ occupies. In addition, the intermediate-frequency signals $S_{1I}$ and $S_{1Q}$ are in-phase and quadrature signals.

Furthermore, a part of a control voltage to be supplied to a variable-capacitance diode in a VCO (Voltage-controlled Oscillator), not shown, of the PLL 31 from the PLL 31 is taken out, and the taken out control voltage is supplied to the tuning circuits 12 and 14 as tuning voltage. Thereby, the tuning to the received signal $S_{RX}$ is realized.

Then the signals $S_{1I}$ and $S_{1Q}$ from the mixer circuits 15I and 15Q are supplied to low-pass filters 16I and 16Q, respectively. The low-pass filters 16I and 16Q have a characteristic to pass the signals $S_{1I}$ and $S_{1Q}$, and intermediate-frequency signals $S_{1I}$ and $S_{1Q}$ at the time of receiving FM broadcast, which will be described later, respectively, as shown in, for example, FIG. 3B. Consequently, the unnecessary signal components such as an adjacent disturbance wave signal of the signals $S_{1I}$ and $S_{1Q}$ that exist outside of the frequency band are removed by the filters 16I and 16Q, and the signals $S_{1I}$ and $S_{1Q}$ without the unnecessary signal components are taken out of the filters 16I and 16Q, respectively.

Next, the intermediate-frequency signals $S_{1I}$ and $S_{1Q}$ outputted from the filters 16I and 16Q are supplied to variable gain amplifiers 22I and 22Q for AGC through subtraction circuits 18I and 18Q and switching circuits 21I and 21Q that are connected to the contacts D on the digital side at the time of receiving the ISDB-T, respectively.

Then, the intermediate-frequency signals $S_{1I}$ and $S_{1Q}$ outputted from the amplifiers 22I and 22Q are supplied to integration circuits 19I and 19Q, so that DC offset voltages $V_{19I}$ and $V_{19Q}$ generated by the amplifiers 22I and 22Q are taken out, respectively. The taken out voltages $V_{19I}$ and $V_{19Q}$ are supplied to the subtraction circuit 18I and 18Q, respectively. Thus, the DC levels of the intermediate-frequency signals $S_{1I}$ and $S_{1Q}$ to be supplied to the amplifiers 22I and 22Q are controlled so that the DC offsets generated by the amplifiers 22I and 22Q are cancelled, respectively. Consequently, the signals $S_{1I}$ and $S_{1Q}$ having no DC offsets are taken out of the amplifiers 22I and 22Q, respectively.

Next, the intermediate-frequency signals $S_{1I}$ and $S_{1Q}$ from the amplifiers 22I and 22Q are supplied to A/D conversion circuits 23I and 23Q, respectively. A/D conversions of the supplied signals $S_{1I}$ and $S_{1Q}$ are executed to change the supplied signals $S_{1I}$ and $S_{1Q}$ to digital intermediate-frequency signals $S_{1I}$ and $S_{1Q}$, respectively. The signals $S_{1I}$, and $S_{1Q}$ after the A/D conversions are supplied to second mixer circuits (24II, 24IQ) and (24QQ, 24QI), respectively. Incidentally, the second mixer circuits 24II–24QI and the latter parts from them actually constitute a DSP, however in FIG. 2, the second mixer circuits 24II–24QI and the latter parts are equivalently shown in a form of analog circuits. It is needless to say that a demodulation circuit 27 is also the case. That is, the demodulation processing may be performed by preparing a demodulation circuit for an analog broadcast and another demodulation circuit for a digital broadcast separately, and by selecting one of the demodulation circuits in accordance with the kind of the received broadcast appropriately.

Besides, second local oscillation signals $S_{LO2I}$ and $S_{LO2Q}$ having the same frequencies as the drifted frequencies of the first local oscillation signals $S_{LO1I}$ and $S_{LO1Q}$, respectively, and phases different from each other by an angle of 90° are formed by a second local oscillation circuit 36. The formed signals $S_{LO2I}$ and $S_{LO2Q}$ are supplied to the second mixer circuits 24II and 24QQ, respectively.

Consequently, the frequency conversions of the intermediate-frequency signals $S_{1I}$ and $S_{1Q}$ are performed at the second mixer circuits 24II and 24QQ, respectively, to convert the signals $S_{1I}$ and $S_{1Q}$ into signals in the base band without frequency drifts, i.e. second intermediate-frequency signals $S_{II}$, and $S_{QQ}$, respectively, the center frequencies of which are zero. Furthermore, in this case, for example, desired wave signal components included in the intermediate-frequency signals $S_{II}$ and $S_{QQ}$ have the same phase to each other, and image signal components included in the signals $S_{II}$, and $S_{QQ}$ have opposite phases to each other.

Then, the intermediate-frequency signals $S_{II}$, and $S_{QQ}$ are supplied to an adding circuit 25I. Consequently, a second intermediate-frequency signal $S_{2I}$ in which the image signal components are set off against each other and only the desired wave signal components are included is taken out.

Besides, the second local oscillation signals $S_{LO2Q}$ and $S_{LO2I}$ from the second local oscillation circuit 36 are supplied to the second mixer circuits 24IQ and 24QI, respectively. Then, the frequency conversions of the intermediate-frequency signals $S_{II}$ and $S_{1Q}$ are performed at the second mixer circuits 24IQ and 24QI, respectively, to convert the signals $S_{1I}$ and $S_{1Q}$ into second intermediate-frequency signals $S_{IQ}$ and $S_{QI}$, respectively, the center frequencies of which are zero. Furthermore, in this case, for example, desired wave signal components included in the intermediate-frequency signals $S_{IQ}$ and $S_{QI}$, have opposite phases to each other, and image signal components included in the signals $S_{IQ}$ and $S_{QI}$, have the same phase to each other.

Then, the intermediate-frequency signals $S_{IQ}$ and $S_{QI}$, are supplied to a subtraction circuit 25Q. Consequently, a second intermediate-frequency signal $S_{2Q}$ in which the image signal components are set off against each other and only the desired wave signal components are included is taken out. Incidentally, in these cases, the intermediate-frequency signals $S_{2I}$, and $S_{2Q}$ have an intermediate-frequency of zero, and their phases are different from each other by an angle of 90°, thus they are in-phase and quadrature signals.

Subsequently, the intermediate-frequency signals $S_{2I}$, and $S_{2Q}$ are supplied to the demodulation circuit 27 through low-pass filters 26I and 26Q for eliminating unnecessary signal components existing outside of the frequency band. The demodulation circuit 27 performs the following demodulation processing at the time of receiving the ISDB-T in accordance with the modulation processing at the time of transmitting the ISDB-T. That is, the processing such as complex Fourier transformation, frequency de-interleave, time de-interleave, selection of digital audio data of a target channel among a plurality of channels, error correction, and data expansion.

Consequently, the digital audio data of a target program among a plurality of programs, or channels, is taken out from the demodulation circuit 27. Then the taken out digital audio data is supplied to a D/A conversion circuit 28, and stereo audio signals L and R are taken out of the D/A conversion circuit 28.

Now, at this time, the intermediate-frequency signals $S_{1I}$ and $S_{1Q}$ from the amplifiers 22I and 22Q are supplied to an AGC detection circuit 35 to form an AGC voltage $V_{35}$. The formed AGC voltage $V_{35}$ is supplied to the variable gain amplifiers 22I and 22Q as a gain control signal.

In addition, the intermediate-frequency signals $S_{1I}$ and $S_{1Q}$ from the mixer circuits 15I and 15Q are supplied to an AGC detection circuit 33 to form a delayed AGC voltage $V_{33}$. The formed AGC voltage $V_{33}$ is supplied to an adding circuit 34, and the AGC voltage $V_{35}$ is supplied to the adding circuit 34. And then, an addition voltage $V_{34}$ of the AGC voltages $V_{33}$ and $V_{35}$ is taken out of the adding circuit 34. The taken out voltage $V_{34}$ is supplied to the variable gain amplifier 13 as a gain control signal.

Consequently, the automatic gain control of the received signal $S_{RX}$ from the tuning circuit 12 is executed in conformity with the AGC voltage $V_{34}$. In addition, the automatic gain control of the intermediate-frequency signals $S_{1I}$ and $S_{1Q}$ from the band-pass filters 17I and 17Q is executed in conformity with the AGC voltage $V_{35}$.

The receiving circuit shown in FIGS. 1 and 2 exhibits the structure and the operation as a receiving circuit in accordance with the double superheterodyne system when the receiving circuit receives an FM broadcast. That is, the FM broadcast wave is received by an antenna 11, and the received signal is supplied to an antenna tuning circuit 12 of an electronic tuning system. Then, as shown in, for example, FIG. 3C, a received signal $S_{RX}$ having a target carrier frequency $f_{RX}$ is picked up, and the received signal $S_{RX}$ is supplied to the first mixer circuits 15I and 15Q through a variable gain amplifier 13 for AGC and an interstage tuning circuit 14 of the electronic tuning system.

Figure 3C:
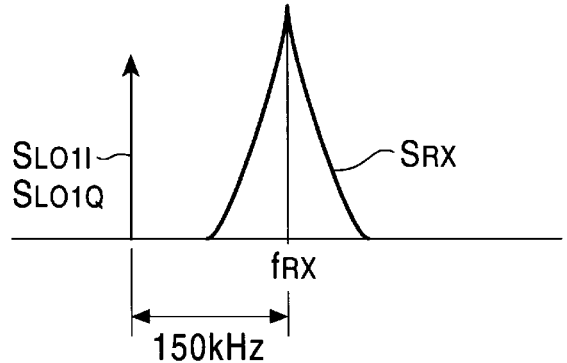

Moreover, the PLL 31 forms an oscillation signal having a predetermined frequency. The formed oscillation signal is supplied to the dividing circuit 32. By the dividing circuit 32, the supplied oscillation signal is divided into two signals $S_{LO1I}$ and $S_{LO1Q}$ having a frequency lower than the carrier frequency $f_{RX}$ of the received signal $S_{RX}$ by, for example, 150 kHz and having phases different from each other by an angle of 90° as shown in FIG. 3C. The divided signals $S_{LO1I}$ and $S_{LO1Q}$ are supplied to the mixer circuits 15I and 15Q, respectively, as the first local oscillation signals.

Figure 3D:
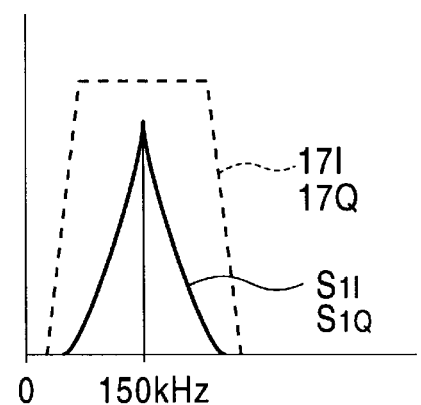

Thus, the frequency conversion of the received signal $S_{RX}$ is executed to convert the received signals $S_{RX}$ into the first intermediate-frequency signals $S_{1I}$ and $S_{1Q}$ having a center frequency, or the intermediate-frequency, of 150 kHz and having phases different from each other by an angle of 90° by the mixer circuits 15I and 15Q as shown in FIG. 3D.

Furthermore, a part of control voltage to be supplied to the variable-capacitance diode in the VCO of the PLL 31 from the PLL 31 is taken out, and the taken out control voltage is supplied to the tuning circuits 12 and 14 as tuning voltage. Thereby, the tuning to the received signal $S_{RX}$ is realized.

Then the intermediate-frequency signals $S_{1I}$ and $S_{1Q}$ from the mixer circuits 15I and 15Q are supplied to the band-pass filters 17I and 17Q through the low-pass filters 16I and 16Q, respectively. The band-pass filters 17I and 17Q have a characteristic to pass the intermediate-frequency signals $S_{1I}$ and $S_{1Q}$, as shown in, for example, FIG. 3D, and work as intermediate-frequency filters. Consequently, the unnecessary signal components, such as an adjacent disturbance wave signal, which exist outside of the frequency band, of the intermediate-frequency signals $S_{1I}$, and $S_{1Q}$ are removed by the filters 17I and 17Q, respectively, and the signals $S_{1I}$ and $S_{1Q}$ without the unnecessary signal components are taken out of the filters 17I and 17Q, respectively.

Next, the intermediate-frequency signals $S_{1I}$ and $S_{1Q}$ taken out of the filters 17I and 17Q are respectively supplied to the A/D converter circuits 23I and 23Q through the switching circuits 21I and 21Q, which are connected to the contacts A on the analog side at the time of receiving the FM broadcast, and further the variable gain amplifiers 22I and 22Q for AGC. Then, the intermediate-frequency signals $S_{1I}$ and $S_{1Q}$ are respectively converted into the digital intermediate-frequency signals $S_{1I}$ and $S_{1Q}$.

Then, the signals $S_{1I}$ and $S_{1Q}$ after the A/D conversions are supplied to the second mixer circuits (24II, 24IQ) and (24QQ, 24QI), respectively. Besides, the second local oscillation circuit 36 forms the second local oscillation signals $S_{LO2I}$ and $S_{LO2Q}$ having a predetermined frequency, for example, equal to the first intermediate frequency 150 kHz and phases different from each other by an angle of 90°. The formed signals $S_{LO2I}$ and $S_{LO2Q}$ are supplied to the second mixer circuits 24II and 24QQ, respectively.

Consequently, the frequency conversions of the intermediate-frequency signals $S_{1I}$ and $S_{1Q}$ are performed at the second mixer circuits 24II and 24QQ, respectively, to convert the signals $S_{1I}$ and $S_{1Q}$ into signals of the base band, i.e. the second intermediate-frequency signals $S_{1I}$ and $S_{QQ}$, respectively, the center frequencies of which are zero. Furthermore, in this case, for example, desired wave signal components included in the intermediate-frequency signals $S_{II}$, and $S_{QQ}$ have the same phase to each other, and image signal components included in the signals $S_{II}$, and $S_{QQ}$ have opposite phases to each other.

Then, the intermediate-frequency signals $S_{II}$, and $S_{QQ}$ are supplied to the adding circuit 25I. Consequently, the second intermediate-frequency signal $S_{2I}$ in which the image signal components are set off against each other and only the desired wave signal components are included is taken out of the adding circuit 25I.

Besides, the second local oscillation signals $S_{LO2Q}$ and $S_{LO2I}$ from the second local oscillation circuit 36 are supplied to the second mixer circuits 24IQ and 24QI, respectively. Then, the frequency conversions of the intermediate-frequency signals $S_{1I}$ and $S_{1Q}$ are performed at the second mixer circuits 24IQ and 24QI, respectively, to convert the signals $S_{1I}$ and $S_{1Q}$ into the second intermediate-frequency signals $S_{IQ}$ and $S_{QI}$, respectively, the center frequencies of which are zero. In this case, for example, the desired wave signal components included in the intermediate-frequency signals $S_{IQ}$ and $S_{QI}$, have opposite phases to each other, and the image signal components included in the signals $S_{IQ}$ and $S_{QI}$, have the same phase to each other.

Then, the intermediate-frequency signals $S_{IQ}$ and $S_{QI}$, are supplied to a subtraction circuit 25Q. Consequently, a second intermediate-frequency signal $S_{2Q}$ in which the image signal components are set off against each other and only the desired wave signal components are included is taken out of the subtraction circuit 25Q. Incidentally, in these cases, the intermediate-frequency signals $S_{2I}$, and $S_{2Q}$ have an intermediate-frequency of zero, and their phases are different from each other by an angle of 90°, thus they are in-phase and quadrature signals.

Subsequently, the intermediate-frequency signals $S_{2I}$, and $S_{2Q}$ are supplied to the demodulation circuit 27 through the low-pass filters 26I and 26Q. Since a part of the demodulation circuit 27 is shared by both the ISDB-T and the FM broadcast, the stereo audio signals of the FM broadcast is demodulated in a form of the digital. Then the demodulated signals are supplied to the D/A conversion circuit 28, and audio signals L and R of the FM broadcast are taken out of the D/A conversion circuit 28.

Furthermore, at this time, the AGC voltages $V_{34}$ and $V_{35}$ are formed by the circuits 33–35 similarly to the time of receiving the ISDB-T, and then the AGC is executed.

The low-pass filters 16I and 16Q and the band-pass filter 17I and 17Q are composed of an active filter circuit including a resistor, a capacitor and an operational amplifier.

Besides, the circuit shown in FIG. 1 is made to be one chip IC except for the tuning circuits 12 and 14 and the resonance circuit in the VCO of the PLL 31. The circuit shown in FIG. 2 is also made to be one chip IC except for the resonance circuit of the second local oscillation circuit 36.

The receiving circuit shown in FIGS. 1 and 2 can receive the narrow band ISDB-T and the FM broadcast. Because the reception of the narrow band ISDB-T is performed in conformity with the direct conversion system, image signals are not generated in principle. Consequently, a necessary image disturbance characteristic can be obtained. In addition, adjacent disturbance wave signals can be eliminated by the low-pass filters 16I and 16Q.

Furthermore, because image signal components are eliminated by twice orthogonal frequency conversions in the double superheterodyne system at the time of receiving the FM broadcast, the necessary image rejection characteristic can be obtained. In addition, adjacent disturbance wave signals can be eliminated by the band-pass filters 17I and 17Q. Consequently, both the narrow band ISDB-T and the FM broadcast can be received in a manner superior in the image rejection characteristic and the adjacent disturbance rejection characteristic.

Furthermore, because the image rejection characteristic at the time of receiving the narrow band ISDB-T or the FM broadcast is improved by the direct conversion processing or the double superheterodyne system, respectively, the intermediate-frequency can be lowered as described above. Accordingly, the receiving circuit can be made to be an IC including the filters 16I, 16Q, 17I and 17Q for the intermediate-frequency filtering. In addition, because almost all of the circuits can be shared, it can be realized to miniaturize the shape thereof and to lower the price thereof.

Furthermore, because the narrow band ISDB-T is received in conformity with the direct conversion system at the time of receiving the narrow band ISDB-T, a DC offset is expected to be generated in the intermediate-frequency signals $S_{1I}$ and $S_{1Q}$ outputted from the amplifiers 22I and 22Q. However, because the expected DC offset is cancelled by the integration circuits 19I and 19Q and the subtraction circuits 18I and 18Q, there occurs no problem owing to the DC offset.

Furthermore, because the FM broadcast is received in conformity with the double superheterodyne system at the time of receiving the FM broadcast, there is no need to consider the DC amplification and the DC offset like in the case of the direct conversion system.

Incidentally, in the aforementioned embodiment, the first intermediate-frequency signals $S_{1I}$ and $S_{1Q}$ outputted from the first mixer circuits 15I and 15Q may respectively be supplied to the band-pass filters 17I and 17Q without passing through the low-pass filters 16I and 16Q at the time of receiving the FM broadcast. Or, when the first intermediate-frequency signals $S_{1I}$ and $S_{1Q}$ outputted from the first mixer circuits 15I and 15Q pass through the low-pass filters 16I and 16Q at the time of receiving the FM broadcast, respectively, the band-pass filters 17I and 17Q may be replaced with high-pass filters to compose band-pass filters together with the low-pass filters 16I and 16Q, respectively. Moreover, it needs scarcely be said that the circuit section after the low-pass filters 16I and 16Q and the band-pass filters 17I and 17Q may consist of a DSP.

Furthermore, when broadcast frequency bands of the FM broadcast and the narrow band ISDB-T differs greatly, two series of the signal lines each composed of the tuning circuit 12, the amplifier 13 and the tuning circuit 14 may be equipped correspondingly to respective broadcasts so that one series of them may be selectively used.

Furthermore, the case where the FM broadcast and the narrow band ISDB-T are received as an analog broadcast and a digital broadcast, respectively, is described above, however, the present invention can be applied to such cases where an AM broadcast is received as the analog broadcast, where broadcasts in a band-diffused system such as OFDM and CDM are received as the digital broadcast, and where broadcasts in a modulation system such as QPSK, QAM and APSK are received as the digital broadcast. In addition, the signals to be broadcast may not necessarily be the audio signals L and R.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. A receiver for receiving an analog broadcast and a digital broadcast, comprising:
   a mixer circuit for performing frequency conversion of a received signal to an intermediate frequency signal by means of a local oscillation signal;
   a filter circuit for taking out the intermediate frequency signal from an output signal of said mixer circuit;
   a first circuit for taking out a DC offset voltage of said intermediate frequency signal from said intermediate frequency signal at the time of receiving said digital broadcast;
   a second circuit for correcting the DC offset of said intermediate frequency signal by using the taken out DC offset voltage; and,
   a demodulation circuit for taking out a signal indicating broadcast contents in one of the analog broadcast and the digital broadcast from the intermediate frequency signal taken out by said filter circuit, wherein:
   a frequency of the local oscillation signal is separated from a carrier frequency of the received signal by an intermediate frequency of the intermediate frequency signal and said demodulation circuit takes out the signal indicating broadcast contents in the analog broadcast from the intermediate frequency signal, at a time of receiving the analog broadcast; and
   the frequency of the local oscillation signal is equal to a center frequency of the received signal and said demodulation circuit takes out the signal indicating broadcast contents in the digital broadcast from the intermediate frequency signal at a time of receiving the digital broadcast.

2. The receiver according to claim 1, wherein said filter circuit has a low-pass characteristic and a band pass characteristic with a center frequency equal to said intermediate frequency of said intermediate frequency signal at a time of receiving said analog signal, and has only a low-pass characteristic for passing said intermediate frequency signal at a time of receiving said digital signal.

3. The receiver according to claim 1, wherein said filter circuit comprises:
   a first filter circuit having a low-pass characteristic for passing said intermediate-frequency signal; and
   a second filter circuit having a band pass characteristic with a center frequency equal to said intermediate frequency of said intermediate frequency signal, wherein:

said first filter circuit and said second filter circuit are both used at the time of receiving said analog broadcast, and only said first filter circuit is used at the time of receiving said digital broadcast.

4. A receiver for receiving an analog broadcast and a digital broadcast, comprising:

a first mixer circuit and a second mixer circuit for performing a frequency conversion of a received signal using a local oscillation signal to generate an in-phase intermediate frequency signal and a quadrature intermediate frequency signal, respectively, wherein phases of in-phase and quadrature intermediate frequency signals are orthogonal to each other;

a first filter circuit and a second filter circuit for taking out the in-phase intermediate frequency signal and the quadrature intermediate frequency signal from output signals of said first mixer circuit and said second mixer circuit, respectively;

an in-phase circuit for taking out DC offset voltages of said in-phase intermediate frequency signal from said in-phase intermediate frequency signal at the time of receiving said digital broadcast;

an in-phase circuit for correcting DC offsets of said in-phase intermediate frequency signal by using the taken out in-phase DC offset voltage;

a quadrature circuit for taking out DC offset voltages of said quadrature intermediate frequency signal from said quadrature intermediate frequency signal at the time of receiving said digital broadcast;

a quadrature circuit for correcting DC offsets of said quadrature intermediate frequency signal by using the taken out quadrature DC offset voltage; and, a demodulation circuit for taking out a signal indicating broadcast contents in one of the analog broadcast and the digital broadcast from the in-phase intermediate frequency signal and the quadrature intermediate frequency signal taken out by said first filter circuit and said second filter circuit, wherein:

a frequency of the local oscillation signal is separated from a carrier frequency of the received signal by an intermediate frequency of the in-phase intermediate frequency signal and the quadrature intermediate frequency signal and said demodulation circuit takes out the signal indicating broadcast contents in the analog broadcast from the in-phase intermediate frequency signal and the quadrature intermediate frequency signal, at a time of receiving the analog broadcast, and the frequency of the local oscillation signal is equal to a center frequency of the received signal and said demodulation circuit takes out the signal indicating broadcast contents in the digital broadcast from the in-phase intermediate frequency signal and the quadrature intermediate frequency signal, at a time of receiving the digital broadcast.

5. The receiver according to claim 4, wherein said first filter circuit and said second filter circuit respectively each have a band pass characteristic with a center frequency equal to said intermediate frequency of said in-phase intermediate frequency signal and said quadrature intermediate frequency signal, at the time of receiving said analog signal, and each have a low pass characteristic for passing said in-phase intermediate frequency and said quadrature intermediate frequency signal at the time of receiving said digital signal.

6. The receiver according to claim 5, wherein said band-pass characteristics of said first filter circuit and said second filter circuit at the time of receiving said analog broadcast are substantially included in said low-pass characteristics of said first filter circuit and said second filter circuit at the time of receiving said digital broadcast.

7. The receiver according to claim 4, wherein said first filter circuit and said second filter circuit respectively comprise:

a first band pass filter circuit and a second band pass filter circuit each having a band pass characteristic with a center frequency equal to said intermediate frequency of said in-phase intermediate frequency signal and said quadrature intermediate frequency signal, respectively; and a first low-pass filter circuit and a second low-pass filter circuit each having a low-pass characteristic for passing said in-phase intermediate frequency signal and said quadrature intermediate frequency signal, respectively, wherein:

said first low-pass filter and said second low-pass filter and said first band pass filter circuit and said second band pass filter circuit are used at the time of receiving said analog broadcast, and only said first low-pass filter circuit and said second low-pass filter circuit are used at the time of receiving said digital broadcast.

8. An IC for receiving an analog broadcast and a digital broadcast, comprising: a mixer circuit for performing frequency conversion of a received signal to an intermediate frequency signal by means of a local oscillation signal;

a filter circuit for taking out the intermediate frequency signal from an output signal of said mixer circuit;

a first circuit for taking out a DC offset voltage of said intermediate frequency signal from said intermediate frequency signal at the time of receiving said digital broadcast; and, a second circuit for correcting the DC offset of said intermediate frequency signal by using the taken out DC offset voltage, wherein:

a frequency of the local oscillation signal is separated from a carrier frequency of the received signal by an intermediate frequency of the intermediate frequency signal at a time of receiving the analog broadcast, and the frequency of the local oscillation signal is equal to a center frequency of the received signal at a time of receiving the digital broadcast, and a signal indicating broadcast contents in one of the analog broadcast and digital broadcast is taken out of the intermediate frequency signal taken out by said filter circuit.

9. The IC according to claim 8, wherein said filter circuit has a low-pass characteristic and a band pass characteristic with a center frequency equal to said intermediate frequency of said intermediate frequency signal at a time of receiving said analog signal, and has only a low-pass characteristic for passing said intermediate frequency signal at a time of receiving said digital signal.

10. The IC according to claim 8, wherein said filter circuit comprises:

a first filter circuit having a low-pass characteristic for passing said intermediate-frequency signal; and a second filter circuit having a band pass characteristic with a center frequency equal to said intermediate frequency of said intermediate frequency signal, wherein:

said first filter circuit is used at the time of receiving said digital broadcast, and said first filter circuit and said second filter circuit are both used at the time of receiving said analog broadcast.

11. An IC for receiving an analog broadcast and a digital broadcast, comprising:

a first mixer circuit and a second mixer circuit for performing a frequency conversion of a received signal using a local oscillation signal to generate an in-phase intermediate frequency signal and a quadrature intermediate frequency signal, respectively, wherein phases of in-phase and quadrature intermediate frequency signals are orthogonal to each other;

a first filter circuit and a second filter circuit for taking out the in-phase intermediate frequency signal and the quadrature intermediate frequency signal from output signals of said first mixer circuit and said second mixer circuit, respectively;

an in-phase circuit for taking out DC offset voltages of said in-phase intermediate frequency signal from said in-phase intermediate frequency signal at the time of receiving said digital broadcast;

an in-phase circuit for correcting DC offsets of said in-phase intermediate frequency signal by using the taken out in-phase DC offset voltage;

a quadrature circuit for taking out DC offset voltages of said quadrature intermediate frequency signal from said quadrature intermediate frequency signal at the time of receiving said digital broadcast; and a quadrature circuit for correcting DC offsets of said quadrature intermediate frequency signal by using the taken out quadrature DC offset voltage, wherein:

a frequency of the local oscillation signal is separated from a carrier frequency of the received signal by an intermediate frequency of the in phase intermediate frequency signal and the quadrature intermediate frequency signal, at a time of receiving the analog broadcast, and the frequency of the local oscillation signal is equal to a center frequency of the received signal, at a time of receiving the digital broadcast, and a signal indicating broadcast contents in one of the analog broadcast and the digital broadcast is taken out of the in-phase intermediate frequency signal and the quadrature intermediate frequency signal taken out by said first filter circuit and said second filter circuit.

12. The IC according to claim 11, wherein said first filter circuit and said second filter circuit respectively have a low pass characteristic and a band pass characteristic with a center frequency equal to said intermediate frequency of said in-phase intermediate frequency signal and said quadrature intermediate frequency signal, at the time of receiving said analog signal, and each have only a low pass characteristic for passing said in-phase intermediate frequency and said quadrature intermediate frequency signal at the time of receiving said digital signal.

13. The IC according to claim 11, wherein said first filter circuit and said second filter circuit respectively comprise:

a first band pass filter circuit and a second band pass filter circuit each having a band pass characteristic with a center frequency equal to said intermediate frequency of said in-phase intermediate frequency signal and said quadrature intermediate frequency signal, respectively; and a first low-pass filter circuit and a second low-pass filter circuit each having a low-pass characteristic for passing said in-phase intermediate frequency signal and said quadrature intermediate frequency signal, respectively, wherein:

said first low-pass filter and said second low-pass filter and said first band pass filter circuit and said second band pass filter circuit are used at the time of receiving said analog broadcast, and only said first low-pass filter circuit and said second low-pass filter circuit are used at the time of receiving said digital broadcast.

* * * * *